US005461924A

United States Patent [19]
Calderara et al.

[11] Patent Number: 5,461,924
[45] Date of Patent: Oct. 31, 1995

[54] SENSOR ARRANGEMENT FOR INSTALLATION IN CARRIAGEWAYS AND RUNWAYS

[75] Inventors: Reto Calderara, Winterberg; Lothar Jahreiss, Zürich; Hans C. Sonderegger, Neftenbach; Markus Caprez, Zürich, all of Switzerland

[73] Assignee: K.K. Holding AG, Switzerland

[21] Appl. No.: 271,661

[22] Filed: Jul. 7, 1994

[30] Foreign Application Priority Data

Nov. 23, 1993 [CH] Switzerland .................. 03482/93

[51] Int. Cl.$^6$ ............................................. G01M 5/00
[52] U.S. Cl. ........................................ 73/786; 73/768
[58] Field of Search ........................... 73/146, 768, 786, 73/855, 862.625; 340/933

[56] References Cited

U.S. PATENT DOCUMENTS

| | | |
|---|---|---|
| 3,535,923 | 10/1970 | Martorana et al. |
| 4,383,239 | 5/1983 | Robert ............................ 340/933 |
| 4,702,329 | 10/1987 | Click . |
| 4,799,381 | 1/1989 | Tromp ........................... 73/146 |
| 4,932,617 | 6/1990 | Heddebaut et al. ................... 340/933 |
| 5,265,481 | 11/1993 | Sonderegger et al. ............ 73/862.625 |
| 5,297,430 | 3/1994 | Sonderegger et al. ............ 73/862.043 |
| 5,313,023 | 5/1994 | Johnson .......................... 73/862.627 |

OTHER PUBLICATIONS

Vehicle Weighting in Motion with Fibre Optic Sensors, J. Boby, S. Teral, J. M. Caussignac and M. Siffert; Mar., 1993, pp. 45–47.

Primary Examiner—Richard Chilcot
Assistant Examiner—Max H. Noori
Attorney, Agent, or Firm—Barnes & Thornburg

[57] ABSTRACT

The invention concerns a sensor arrangement which is installed in the surface of carriageways or runways and serves to detect the wheel loads of vehicles or aircraft and/or their shear components on the surface during travel. The construction of the flanged tube sensor with piezoelectric crystal plates makes possible modular assembly, in that either piezo-plates sensitive to pressure P only, or to shear S, or to combinations of both are installed, since all piezo-plates have the same dimensions. The force introduction flange makes possible a concentration of the force lines onto the measuring arrangement with a substantial mechanical amplifying effect. The packing of the flanged tube sensor ready to install ensures proper fitting and positioning in the installation groove. Here the two rolling force insulation compounds and the foam insulator of the tubular part are important. The application of the invention lies in traffic management for weight detection. With the addition of shear measuring, new applications are feasible in vehicle testing tracks and aircraft landing runways, opening up new aspects of driving dynamics and security.

20 Claims, 5 Drawing Sheets

SENSOR ARRANGEMENT FOR INSTALLATION IN CARRIAGEWAYS AND RUNWAYS

The invention relates to a sensor arrangement which is installed in the surface of carriageways and aircraft runways for the dynamic detection of reaction forces acting on the surface, as well as speeds and other measurements.

The invention proceeds from the state of the art according to EP Application 0 491 655 A1 of 13th Nov. 1991 and U.S. Pat. No. 5,265,481. In this application a tubular sensor is described, accommodating an elastically preloaded measuring arrangement of piezoelectric plates, typically quartz. This tubular sensor is laid in the road surface in a groove about 50 mm deep, and filled over with a mixture of plastic and sand.

The purpose of the invention is to improve arrangements of the present kind so that much more reliable measuring signals are obtained, making possible in particular more accurate automatic computer evaluation. Moreover the additional capability of measuring shear forces has given the invention a new dimension.

The principal elements of the invention are explained in more detail with reference to 17 figures.

Figure 3:
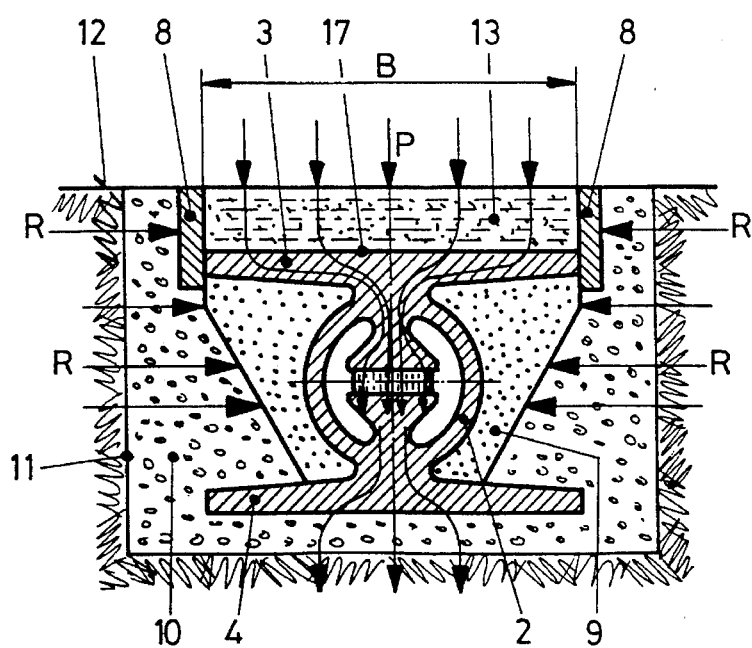
Figure 4:
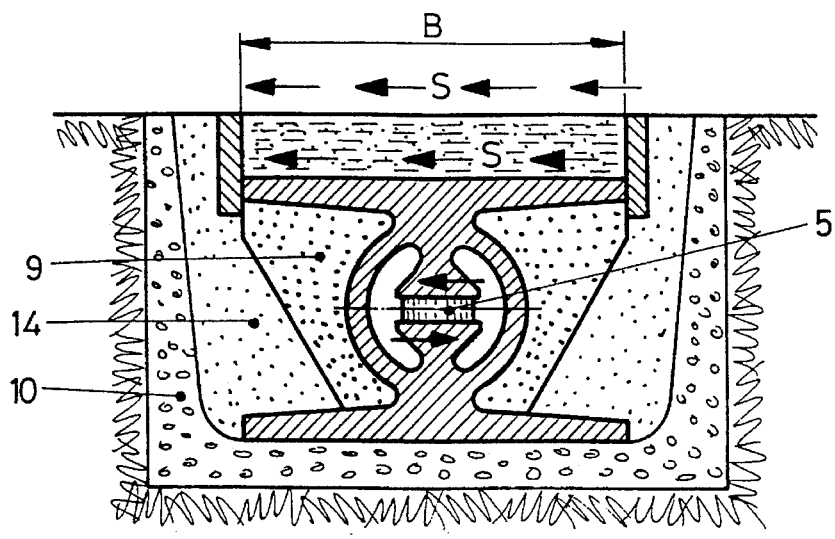
Figure 5:
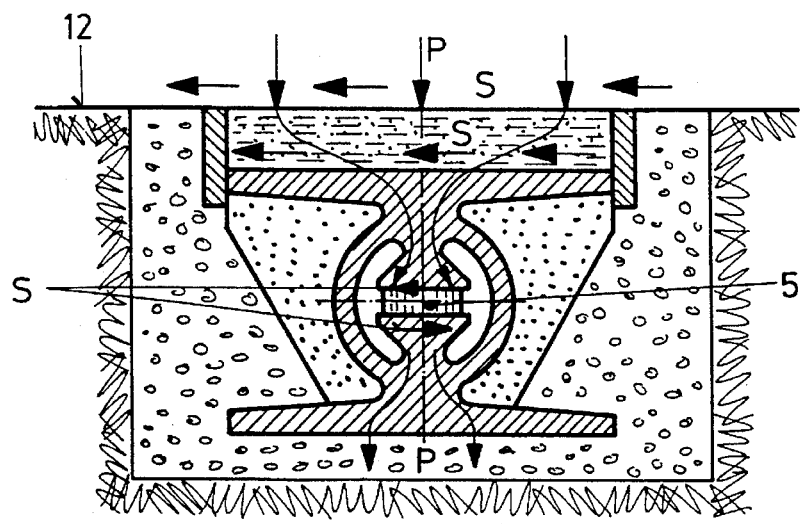
Figure 6:
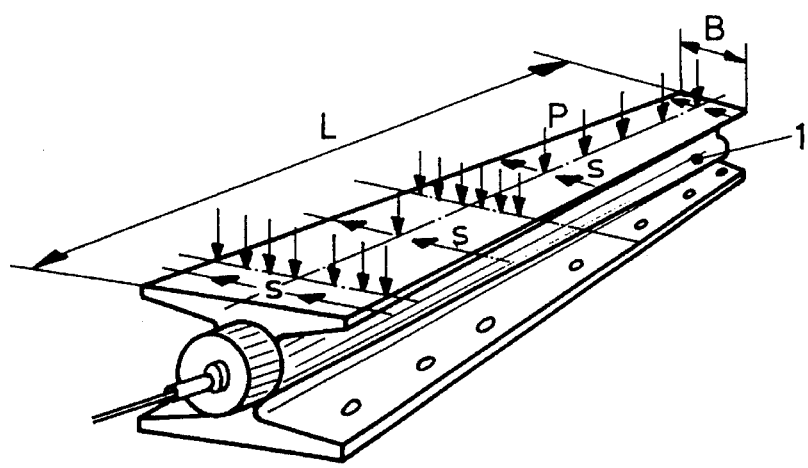
Figure 7:
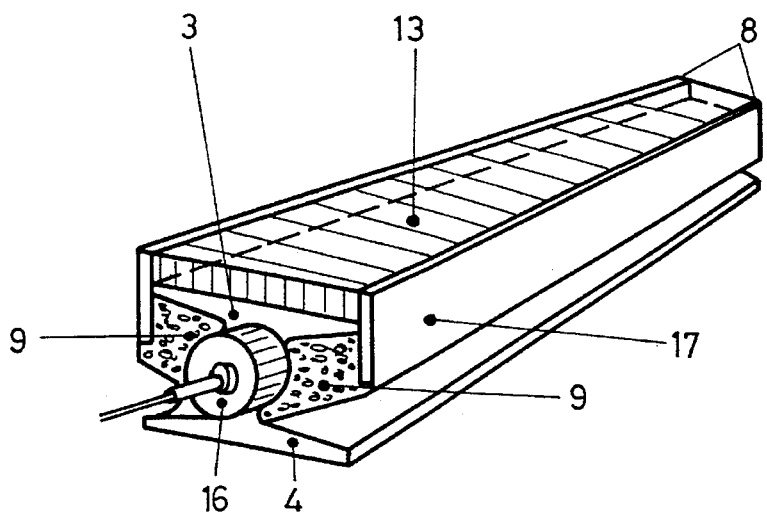
Figure 8:
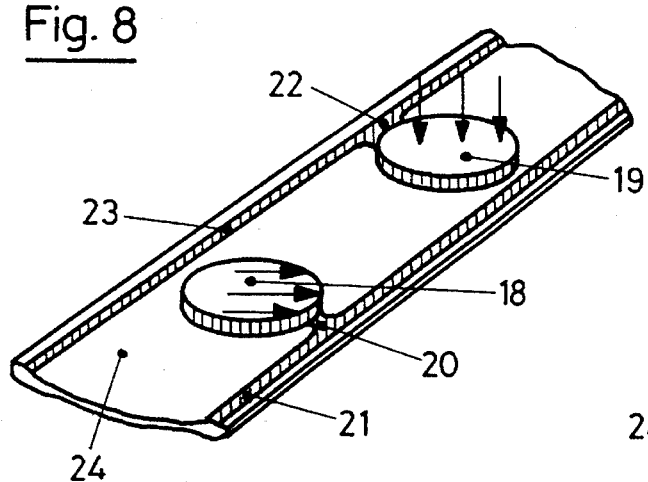
Figure 9:
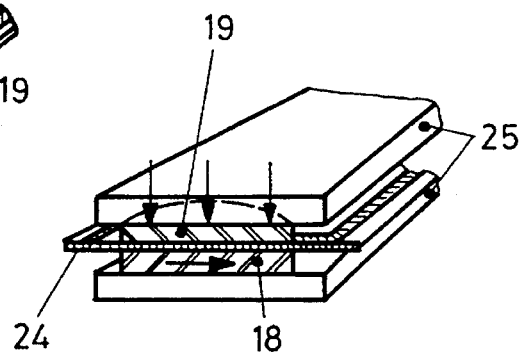
Figure 10:
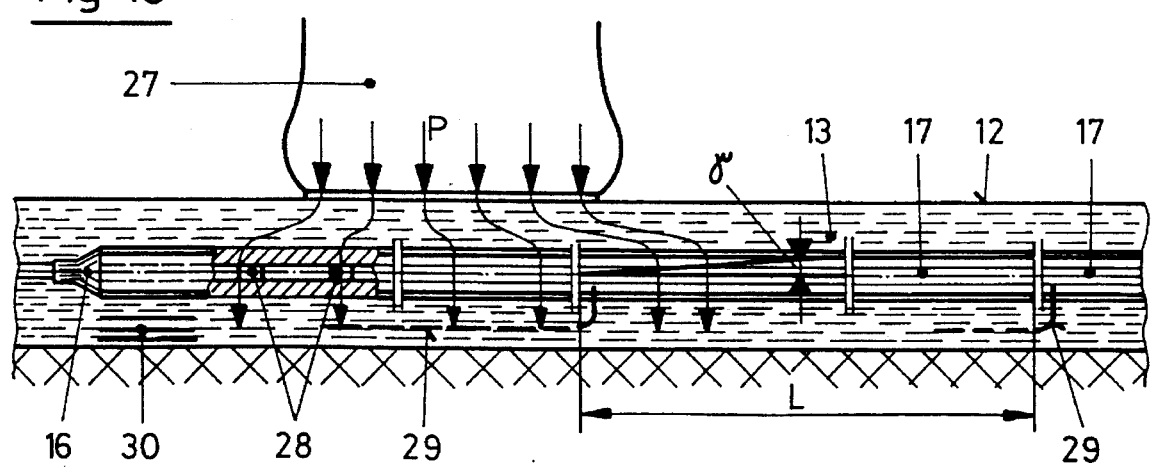
Figure 11:
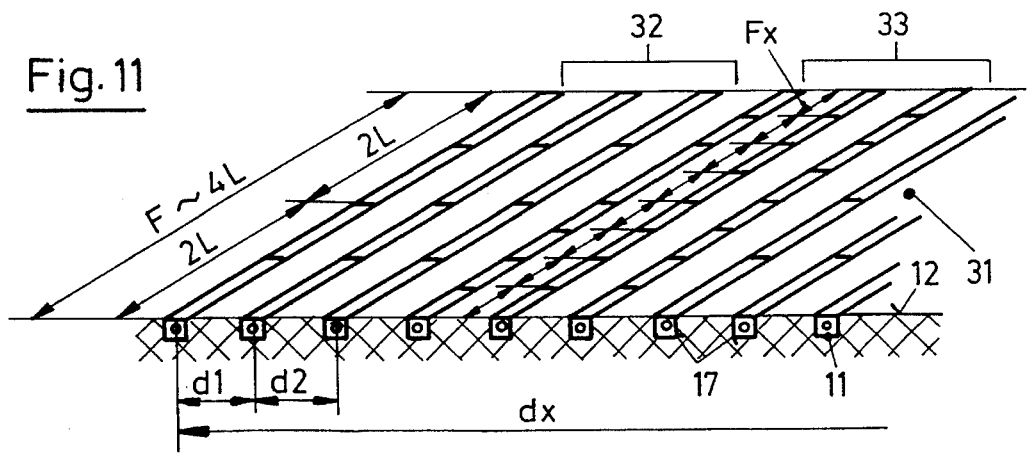
Figure 12:
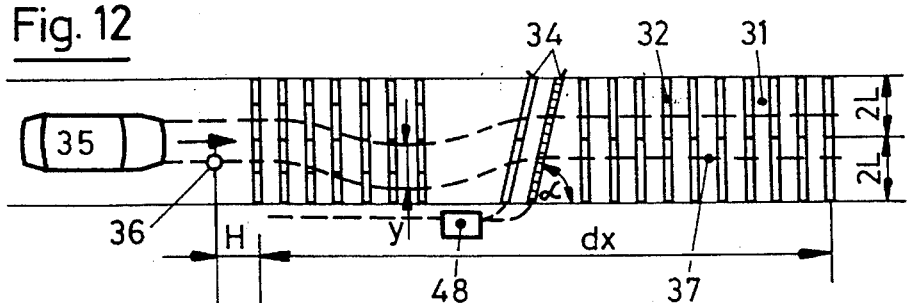
Figure 13:
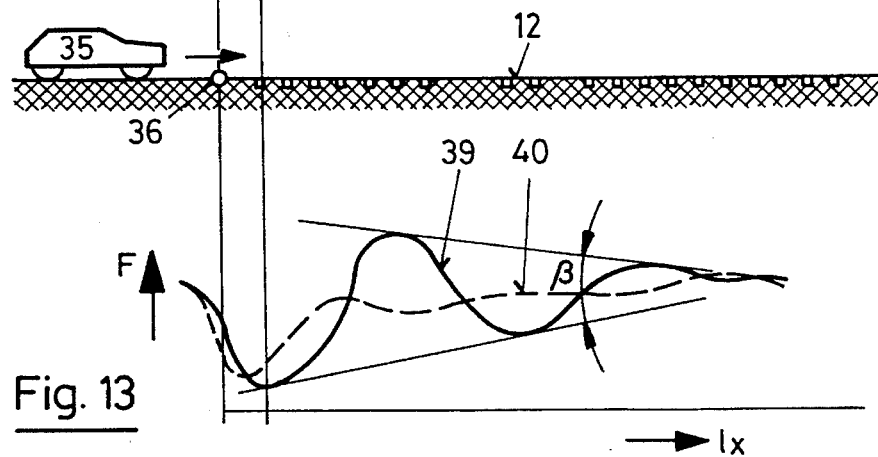
Figure 14:
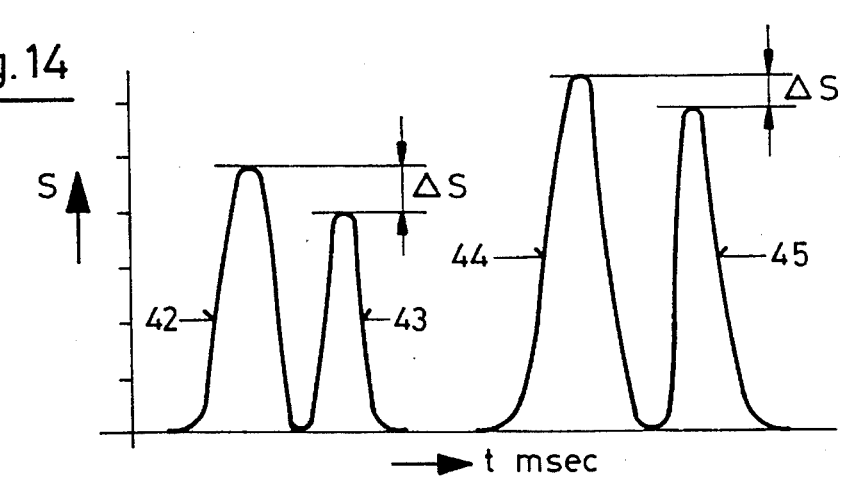
Figure 15:
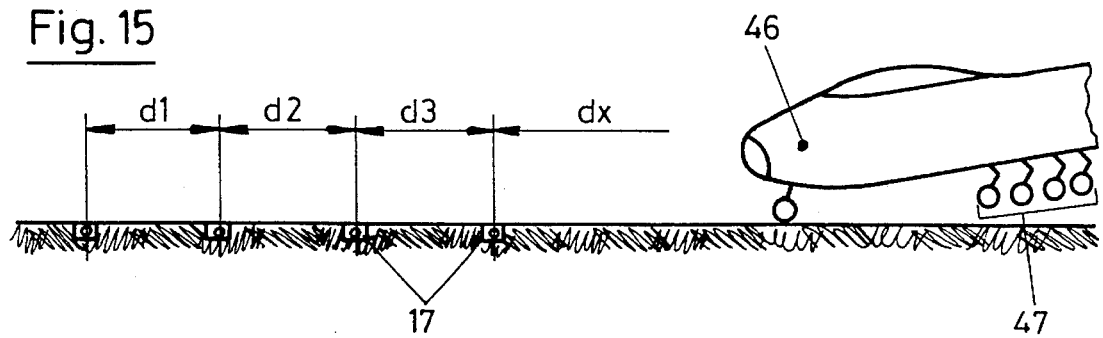
Figure 16:
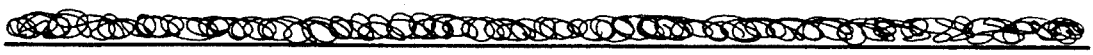
Figure 16:
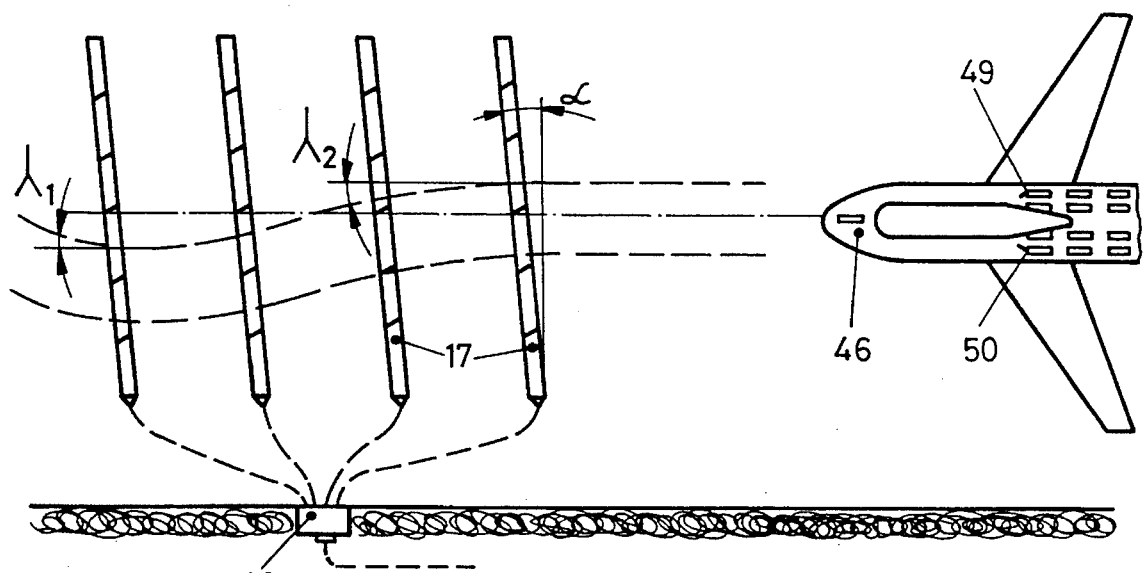
Figure 17:
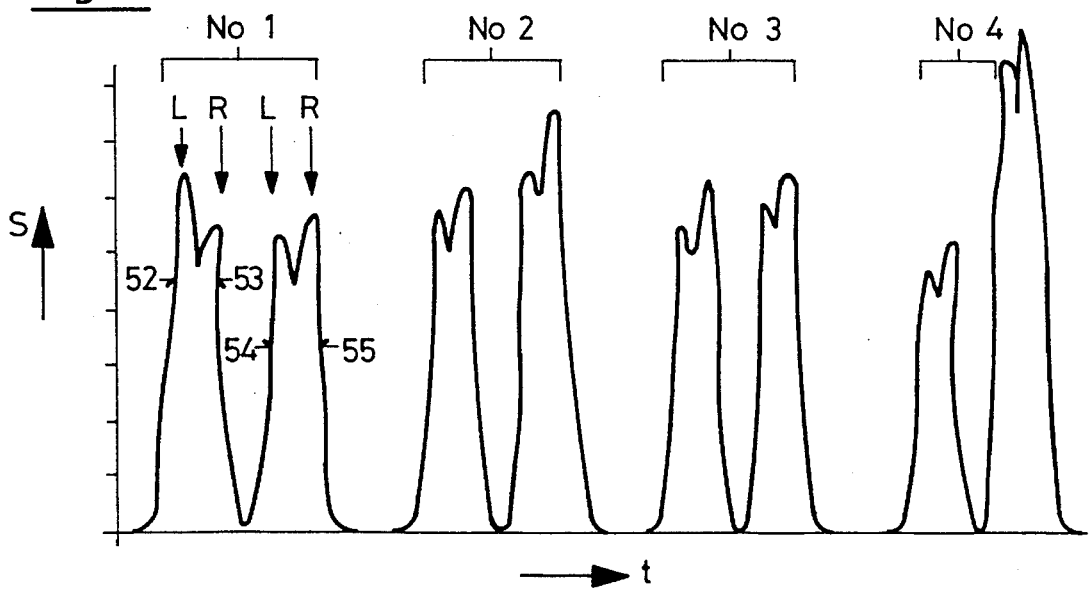

FIG. 3 shows an embodiment of the sensor according to the invention in the installed state, FIG. 4 shows an embodiment of the sensor according to the invention for measuring shear force, in the installed state, FIG. 5 shows an embodiment of the invention for combined wheel load and shear force measuring, in the installed state, FIG. 6 shows the sensor according to the invention, FIG. 7 shows the sensor according to the invention ready for installation, FIG. 8 shows a printed circuitry arrangement with pressure and shear piezo-crystals in series, FIG. 9 shows a similar circuit with pressure and shear piezo-crystals arranged one above the other, FIG. 10 shows a sensor arrangement in longitudinal section, laid in a road surface, FIG. 11 shows a multiple sensor array for test vehicles on a test runway, FIG. 12 shows a test runway as in FIG. 11 in plan and elevation, FIG. 13 shows an evaluation variant of vehicle suspension, FIG. 14 shows another evaluation variant with shear results, FIG. 15 shows a multiple sensor array in an aircraft runway, in section, FIG. 16 shows the array in FIG. 15 in plan, FIG. 17 shows one of the evaluation variants of reverse thrust values from the individual wheels.

Figure 1:
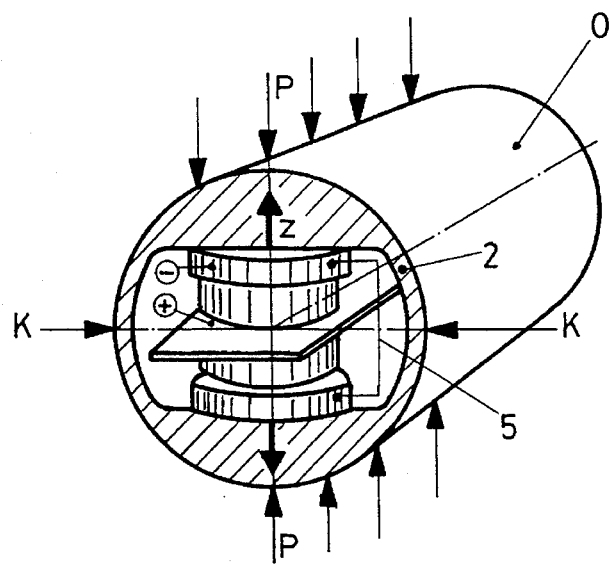
FIG. 1 shows the state of the art.

FIG. 1 shows the state of the art according to EP application 0 491 655 A1, with the tubular sensor 0 accommodating the measuring arrangement 5 in the tubular part 2.

Figure 2:
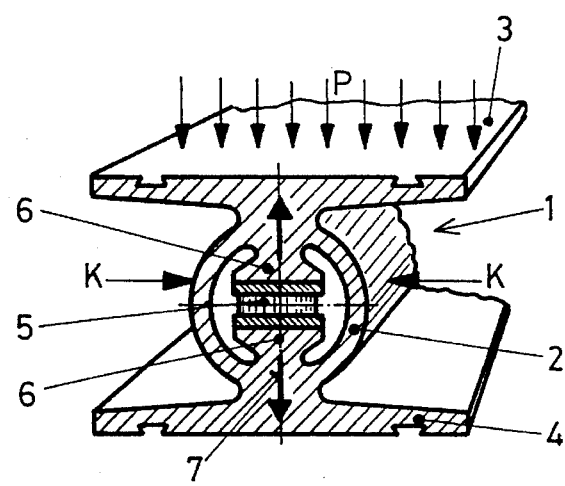
FIG. 2 shows an embodiment of the invention in cross section.

FIG. 2 shows a sensor according to the invention, in the form of a flanged tube sensor 1 consisting of a tubular part 2, force introduction flange 3, force anchoring flange 4 and measuring arrangement 5. To fit the measuring arrangement 5 by pushing it in, the flanged tube sensor is pressed laterally with the locking force K, causing the mountings 6 of the measuring arrangement 5 to move in the direction of the arrows 7 and produce a gap. After releasing force K, the measuring arrangement 5 is fitted under high elastic preload without any gap effect.

Compared with the state of the art, the integral force introduction flange 3 according to the invention achieves a concentration of the force lines P onto the measuring arrangement 5, giving a significantly improved signal quality and a mechanical amplification effect.

The flanged tube sensor 1 is distinguished by a substantially increased elasticity of the tubular part 2, thanks to the extension of the tube wall 2 into the range of the transition into the flange 3.

FIG. 3 shows the flanged tube sensor 1 according to the invention, fitted into a road surface 12. For this it is supplied prepared according to FIG. 7. After positioning the sensor 17 ready for installation in the groove 11, it is embedded with the filling 10 and levelled off flush with the surface 12.

The sensor 17 stocked ready to install by the maker consists of the flanged tube sensor 1, the rolling force insulation compounds 8 which in the installed state reach up to the road surface, and the lateral foam insulators 9, which insulate the tubular part 2 from leading and lagging rolling forces R. These lateral rolling forces R diminish with the depth of the roadway and are greatest immediately below the road surface, so that the force introduction flange 3 with the filling compound 13 is protected from all lateral rolling forces R up to the road surface 12. The rolling force insulation 8 may consist of a silicone rubber band for example. The filling compound 13 poured in between the rolling force insulation 8 must have mechanical properties as similar as possible to those of the road surface 12. The embedding compound 10 enwraps the force anchoring flange 4 and bonds it to the road bed, positioning the sensor 17 ready for installation in the desired location. The width B of the force introduction flange 3 is optimized so that a single tubular part 2 is sufficient.

It lies within the scope of the invention, however, to increase the width B of the force introduction flange so that two or more tubular parts 2 may be arranged side by side and joined with the flange. The embedding compound 10 and the filling compound 13 consist usually of sand and plastic mixtures, whose composition may be adapted to the mechanical properties of the roadway materials. A mixture of 75% Araldit casting resin and 25% quartz sand has proved particularly efficacious.

FIG. 4 shows the same sensor arrangement according to the invention as is FIG. 3. Fitted in the measuring arrangement 5, however, are piezo-plates sensitive to shear and having exactly the same dimensions. New metrological possibilities are opened up by this. As a variant, between the insulating foam 9 of the tubular part and the embedding compound 10 an intermediate compound 14 is provided, which may also be a mixture of sand and plastic.

In FIG. 5 a sensor arrangement according to FIG. 3 is again shown. Fitted in the measuring arrangement 5, however, are piezo-plates of identical dimensions sensitive to both shear and pressure. This enables weight and shear components to be measured separately, opening up further application possibilities.

FIG. 6 shows the flanged tube sensor 1 after fitting the measuring arrangement 5. In this form the sensor can be used for other purposes too, such as automation.

In FIG. 7 the flanged tube sensor 1 designed for roadway installation is shown as a sensor ready for installation 17. The filling compound 13 is potted rigidly between the two rolling force insulations 8, and the foam insulators 9 of the tubular part are likewise fixed ready for installation. Shown as a variant is an centric connecting part 16. For fitting one behind the other, however, outside connecting lines are better, as shown in FIG. 10.

Shown in FIG. 8 is part of a measuring arrangement 5 having piezo shear plate 18 and piezo pressure plate 19 arranged one behind the other on the insulating plate 24, which has conductors 23 for pressure plates 19 and conductors 21 for shear plates 18.

FIG. 9 shows part of a measuring arrangement 5 having piezo shear plate 18 and piezo pressure plate 19 disposed one above the other. Arranged between them is the insulating plate 24, provided with conductors on both sides. The piezo-plate assembly is placed to advantage between two guide rails 25, which are preloaded mechanically or bonded with insulating adhesives into a subassembly, which can be pushed in simple fashion into the opened tubular part 2.

FIG. 10 shows a roadway cross section with a sensor arrangement according to the invention. The sensor elements ready for installation 17 are placed one next to the other with as little space as possible between them. The connecting lines 29 of the sensors 17 are led out radially at one end each and in the filling compound to the collective channel 30. A central connecting part 16 is also possible in principle, however. The external individual lines to the junction box make possible a standard sensor of length L, which is sealed off and may be combined into any lengths. This enables the measuring system to be adapted easily to a possibly cambered road surface, by angling the axes with the angle γ.

FIGS. 11, 12, 13 and 14 show the installation and evaluation of a vehicle testing track having a number of sensors 17, e.g. ten or more, with optimal spacing d1, d2, and thus combined to form a testing distance 31, which can be linked on-line to the assembly line of a car plant for example. This enables the driving dynamics of a vehicle to be checked in a single run, without having to fit a single additional measuring instrument on the car.

FIG. 11 shows the testing distance 31 in sectional view. Assuming that the sensor ready for installation has a standard length L=1 m, a normal carriageway will need about four sensors ready to install in a single groove 11. This enables the carriageway width to be divided additionally into four sections. As shown in FIGS. 8 and 10, it would be quite possible to effect a further subdivision within the sensor by wiring the piezo-plate pairs 28 separately, dividing the carriageway width into ten or more subsections. Additional possibilities emerge from this. Grooves 11 can be laid with groups of standard sensors 32 and others with finer subdivision 33.

FIG. 12 shows a testing distance 31 which may have an obstacle 36 at the beginning, to which the steering and suspension respond for example.

One or more sensors 34 are laid in a carriageway slightly slanted by the angle α, yielding force signals offset in time and thus providing additional information.

Thus the following can be measured with two sensors 34: individual wheel force, weight (total), speed, wheel bases, weight distribution left-right, wheel track and alignment, double wheel detection, automatic cross sensitivity.

Thus the angling of a measuring channel makes possible calibration of the sensitivity over the width of the carriageway F. Owing to rutting of the carriageway, considerable measuring errors may arise, which have to be revealed and prevented by countermeasures. Calibrating the cross sensitivity will disclose such errors. For this a calibration vehicle, the weights of whose left and right wheels are known, is run several times over the full width of the carriageway in stages. At each successive run the individual wheel weights left-right are compared. If the individual weights remain within the tolerance limits across the width F, no wear or deformation of the carriageway has taken place as yet. Such calibration is of course possible only with subdivided measuring channels 33, 34, which detect the measuring signals of the left and right sides separately.

The wheel alignment of a vehicle may of course be detected also with the sensors fitted at right angles to the carriageway and appropriate fine subdivision, instead of slanted sensors and long-time measurements.

For the measurements named, the obstacle 36 is not necessary of course. Nevertheless it may serve for testing the vehicle dynamics by exciting vibrations.

FIG. 13 shows an evaluation variant of the weight components, in which the effect of the vehicle suspension, shock absorbers and steering are examined. A normal decay 40 can for example be compared in simple manner with an unsatisfactorily damped shock 39, which shows a much high damping decrement β.

A substantial extension of the measuring capabilities is obtained by fitting sensors according to FIGS. 4 or 5. The additional measuring of shear components, whether for braking, starting or acceleration, gives the testing distance 31 a new dimension.

FIG. 14 shows an evaluation variant of the shear components as when braking or accelerating. Here 42 is the shear component of the right front wheel, 43 that of the left front wheel, 44 that of the right rear wheel and 45 that of the left rear wheel.

From the possibilities indicated it will be seen that a testing distance 31 according to the invention will enable routine investigations to be performed quickly on any vehicles. A complete test of the driving dynamics concerning stability, steering, suspension, braking and starting behaviour can be carried out in a single run with the necessary software, without any instrument fitted in the actual vehicle.

The simultaneous measuring of shear and weight components allows the coefficient of frictio $$\rho = \frac{\Delta p}{\Delta S}$$

to be determined, providing further very important evaluation possibilities for the arrangement according to the invention.

Shown in FIGS. 15, 16 and 17 is a further application according to the invention, for aircraft landing runways, since an aircraft on the ground also constitutes a vehicle. The touch-down zone of the runway can be equipped with a similar testing distance 31 to that in FIGS. 11 and 12.

FIG. 15 shows a simplified installation with only four sensors 17 for example, with optimal spacing d1, d2, d3 at a distance dx from the start of the runway. The aircraft 46 is just at the beginning of the touch-down phase, when the main undercarriage 47 touches the ground. An undercarriage with eight double wheels is shown in the example.

FIG. 16 shows the installation in plan, with the sensors subdivided and arranged at an angle α. By virtue of the subdivision as shown in FIG. 11, any deviation of the braking track is recognizable at once, i.e. the alteration and correction angles $\lambda_1$, $\lambda_2$, in any weather and at any time of day. From these deviations a number of important conclusions concerning the anti-lock braking system can be drawn.

FIG. 17 shows the braking diagrams for the individual double wheels.

The two double peaks No. 1 indicate:

52 reverse thrust left double wheel of 50

53 reverse thrust right double wheel of 50

54 reverse thrust left double wheel of 49

55 reverse thrust right double wheel of 49

Similar diagrams are obtained for the double wheel sets Nos. 2, 3 and 4. Depending on whether the installed sensor group 17 according to the invention responds to weight, shear or both in combination, all principal components of the landing operation can be checked in a single landing. Moreover the performance of the pilot can also be verified from the position of the touch-down and the braking means applied.

Of great interest also is the state of the runway surface with regard to fouling by rubber abrasion, oil patches and wet. The coefficient of braking friction $\rho$ may be decisively altered by this. The arrangement according to the invention enables the change in the friction coefficient $\rho$ to be ascertained from one landing to another, so that the state of the runway surface can be monitored.

The explanations and the figures show that the sensor arrangement according to the invention will make possible new applications with important new quality and security aspects by virtue of the combination of weight and shear components.

While the weight detection of moving vehicles constitutes an international research project extending over several years, the combined weight and shear measurement according to the invention, in conjunction with the already known traffic management with weight monitoring, brings new applications in vehicle quality monitoring as in the observance of traffic security measures.

The examples shown can be embodied most simply by exploiting the piezoelectric effects of pressure and shear plates 18, 19. These plates may consist both of piezoceramic or of monocrystals. The best results are obtainable with quartz crystal plates, which also allow quasistatic calibration. Moreover quartz crystals have no pyroelectric effects, as are observed with all piezoelectric systems employed previously. Sudden thunderstorms or alternating sunshine may cause rapid temperature gradients, which however do not affect the signals with quartz crystals.

Another major advantage of quartz crystals lies in the possibility of quasistatic weight calibration, whereby a test vehicle with axle weights previously measured statically, i.e. known, is driven very slowly over the sensor array. This excludes additional vibrations due to the suspension, whose errors cannot be suppressed at speeds above 1 km/h. With ceramic piezoelectric elements this quasistatic calibration is not possible.

However the invention and its applications are not confined to piezoelectric effects. Other measuring arrangements might be used also, such as capacitive or resistive ones.

We claim:

1. Sensor arrangement for installation in roadways' or runways' surfaces, for detecting one or more of the weights and dynamic reactions of vehicle wheels comprising:

a hollow section sensor with a measuring arrangement inside it and press-fitted against the wall of a tubular part; and a force introduction flange joined tangentially to the tubular part to concentrate and amplify the forces, acting perpendicular to and along said surface, onto the measuring arrangement.

2. Sensor arrangement according to claim 1, wherein the force introduction flange has a plate, with a force anchoring flange attached to the opposite side of the tubular part for fixing in the surface.

3. Sensor arrangement according to claim 1, wherein a mounting of the measuring arrangement is joined to the tubular part by a constriction produced by the elasticity of the tubular part to produce a compressive join without air gap between the measuring arrangement and the force introduction flange and tubular part.

4. Sensor arrangement according to claim 1 wherein the force introduction flange has a filling compound thereon with mechanical properties similar to those of the surface and has a rolling force insulation compound at both sides of the force introduction flange and filling compound serving as boundary and extending up to the surface.

5. Sensor arrangement according to claim 2 wherein the tubular part is covered with foam insulation so that an underside of the force introduction flange, the tubular part and part of the force anchoring flange are packed tight, making a unit that can be prefabricated by the manufacturer and prepared as a sensor ready for installation.

6. Sensor arrangement according to claim 1 wherein the sensor ready for installation has a length L in a conveniently divisible ratio to the overall width of a runway, and with separate lateral cable connection which is led out of the tubular part sealed and extends in length up to a junction box.

7. Sensor arrangement according to claim 1 wherein the measuring arrangement includes piezoelectric crystals sensitive to pressure only.

8. Sensor arrangement according to claim 1 wherein the measuring arrangement includes piezoelectric crystals sensitive only to shear normal to a sensor axis.

9. Sensor arrangement according to claim 1 wherein the measuring arrangement includes crystal types for both pressure and shear.

10. Sensor arrangement according to claim 1 wherein the measuring arrangement is modularly so that pressure only, shear only and both pressure and shear embodiments have the same fitting dimensions for enabling weight components alone, shear components alone or weight and shear components on the surface to be measured.

11. Sensor arrangement according to claim 1 wherein the measuring arrangement includes piezoelectric crystals being monocrystals such as quartz.

12. Sensor arrangement according to claim 1 wherein the measuring arrangement includes piezoelectric crystals consisting of piezoceramics.

13. Sensor arrangement according to claim 1 wherein the measuring arrangement includes one or more of capacitive and resistive elements.

14. Sensor arrangement according to claim 1 wherein a plurality of the sensors are spaced along a vehicle testing run so that the dynamic behavior of a test vehicle can be investigated with regard to suspension, steering, braking or starting performance.

15. Sensor arrangement according to claim 1 wherein a plurality of the sensors are installed in aircraft runways, so that in particular lateral deviations $\lambda_1$, $\lambda_2$ due to faulty anti-lock braking system actions, also reverse thrusts of the individual undercarriage wheels, can be verified.

16. Sensor arrangement according to claim 15 wherein the measuring arrangement measures pressure and shear and the sensor arrangement determines the coefficient of friction $\rho$ of the runway surface.

17. Sensor arrangement according to claim 14 wherein at least one of the sensor arrangements is slanted with respect to the run by the angle $\alpha$ to make possible measured values differing in time from the left and right wheels of a vehicle.

18. Procedure for calibrating a sensor arrangement characterized by the amenability of quartz piezoelectric crystals to quasistatic calibration being utilized to run a test vehicle with known axle weights over the sensor arrangement at a speed significantly below 1 km/h, so that all vibration effects due to the vehicle's suspension are suppressed and the vehicle's static weight corresponds to the vehicle's quasistatic weight.

19. Procedure for calibrating a sensor arrangement including a measuring channel being slanted with respect to an axis of a road by an angle $\alpha$ to enable calibration of sensitivity variation across the roads width, comprising running a calibration vehicle with known axle loads over the measuring channel several times shifting from the left to the right side of the road, and comparing signals from the individual wheels left and right.

20. Sensor arrangement according to claim 15 wherein at least one of the sensor arrangements is slanted with respect to an axis of the runway by an angle $\alpha$ to make possible measured values differing in time from the left and right wheels of a vehicle.

* * * * *